United States Patent [19]

Miller

[11] 3,898,158

[45] *Aug. 5, 1975

[54] REVERSE OSMOSIS SEPARATOR UNIT

[76] Inventor: Edward F. Miller, 215 Lipan Way, Boulder, Colo. 80303

[ * ] Notice: The portion of the term of this patent subsequent to Oct. 1, 1991, has been disclaimed.

[22] Filed: Aug. 8, 1974

[21] Appl. No.: 495,637

Related U.S. Application Data

[63] Continuation-in-part of Ser. No. 315,929, Dec. 18, 1972, Pat. No. 3,839,201.

[52] U.S. Cl. .................... 210/22; 210/23; 210/321; 210/500
[51] Int. Cl. ............................................. B01d 13/00
[58] Field of Search ........... 210/23, 321, 500 M, 22, 210/433

[56] References Cited
UNITED STATES PATENTS

| | | | |
|---|---|---|---|
| 3,795,317 | 3/1974 | Van Zon | 219/433 X |
| 3,820,661 | 6/1974 | Poges | 210/433 X |
| 3,839,201 | 10/1974 | Miller | 210/23 X |

Primary Examiner—Frank A. Spear, Jr.
Assistant Examiner—Ferris H. Lander
Attorney, Agent, or Firm—Flynn & Frishauf

[57] ABSTRACT

A reverse osmosis separator unit is comprised of a plurality of reverse osmosis separator stages, each stage including a semi-permeable membrane. At least one stage of the unit is comprised of a plurality of semi-permeable membranes and at least one stage preferably includes generally annularly arranged membranes. A feed solution under pressure is fed to at least one of the stages, and at least one outlet is connected to each of the stages for drawing off the solution from each stage after the feed solution has passed through at least a longitudinal portion of the respective stage. The pressure of the input (feed) solution is sufficient to maintain the pressure in the first stage substantially above the osmotic pressure in the stages to permit a portion of the feed solution to permeate and pass through the respective membranes, without requiring additional pressurization. The unit is preferably enclosed by an outer casing, and the solution which permeates and passes through the final stage, which preferably is the space between the outer membrane(s) and the outer casing, is drawn off as separated output. Valves are incorporated in each of the outlet lines, including both inter-stage concentrated solution draw-offs in the direction axial to the permeate flow, and in the permeate outlet line from the last stage.

29 Claims, 13 Drawing Figures

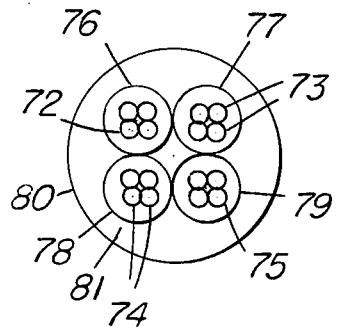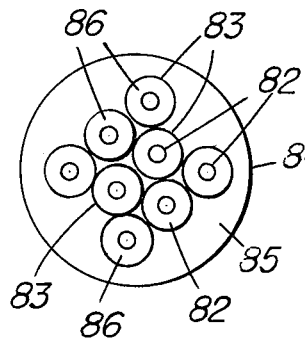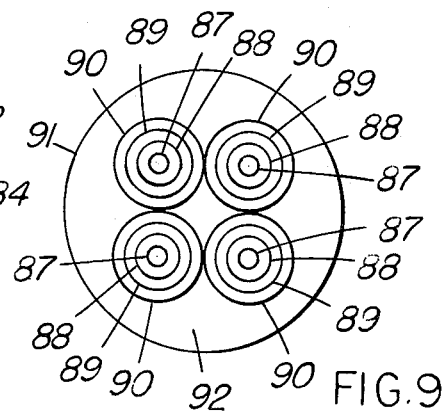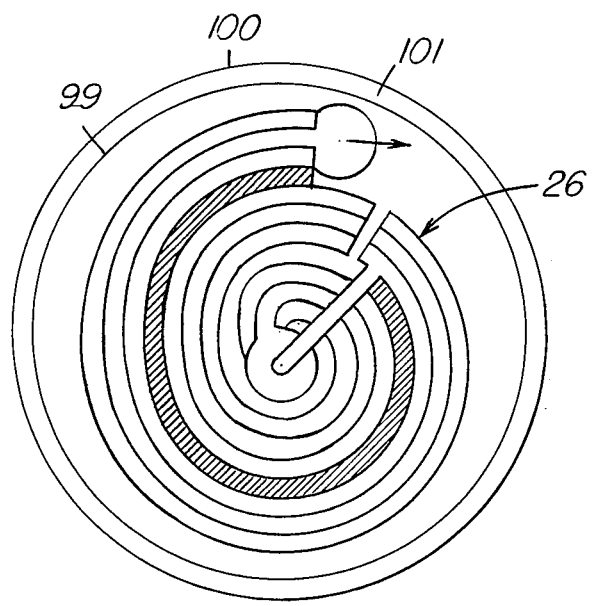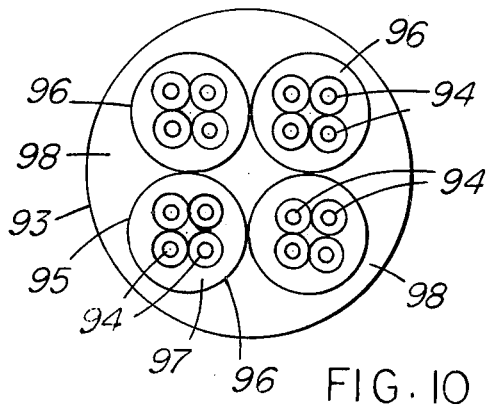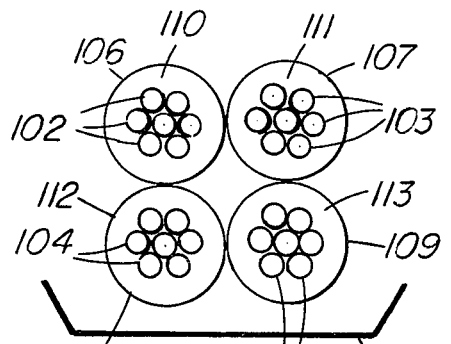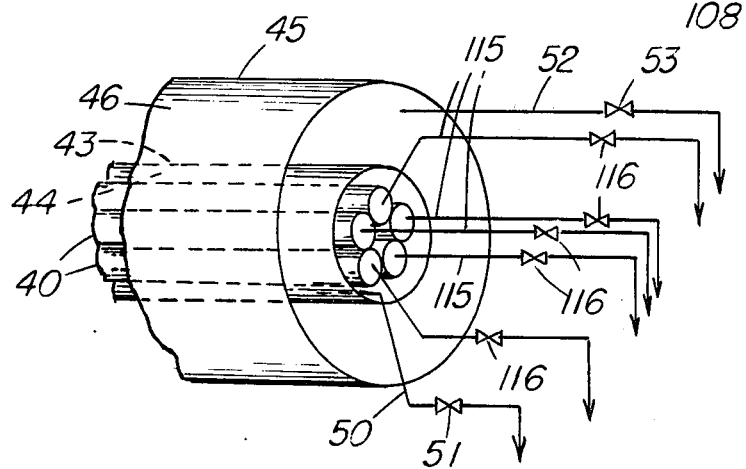

REVERSE OSMOSIS SEPARATOR UNIT

CROSS REFERENCE TO RELATED APPLICATION

This is a continuation-in-part of U.S. Application Ser. No. 315,929, filed Dec. 18, 1972, now U.S. Pat. No. 3,839,201.

FIELD OF INVENTION

This invention has to do with reverse osmosis separator units, and with a process in which said units are employed.

BACKGROUND OF THE INVENTION

Reverse osmosis involves the use of semi-permeable membranes which, under the application of pressure to a feed stream, permit passage of water molecules but hold back all or part of the undesired solute in the feed stream. In the desalination of salt-containing waters such as brackish waters and seawater, several desalination stages may be employed to effect a stepwise reduction in the salinity of the feedwaters to potability levels or better. The feedwater, under pressure, is charged to a first unit containing a semi-permeable membrane, and a water product of lesser solute content is obtained together with a stream of greater solute content. The degree of desalination achieved is dependent on the salt-rejection characteristic of the semi-permeable membrane employed. The water product is then repressurized and charged to a second unit containing the same or different type of semi-permeable membrane with the same or different salt-rejection characteristic, with the result that a relatively purer water product is obtained together with a stream of greater solute content than the repressurized water product. Thus, interstage repressurization is employed, with concomitant increase in plant investment and operating costs. In particular, energy requirements for the plant are substantial.

This invention is directed to substantially reducing or eliminating the need for interstage repressurization and to permit the utilization of a series of low to intermediate salt-rejection semi-permeable membrane stages, instead of a single or more high salt rejection membranes, thus materially reducing the overall energy requirements of a reverse osmosis plant.

SUMMARY OF THE INVENTION

In accordance with this invention, there is provided a reverse osmosis separator unit comprising a plurality of reverse osmosis separator stages, each stage including at least one semi-permeable membrane. The membranes are arranged so as to provide at least one generally annulated unit or stage. A pressurized charge inlet is connected to at least one of said stages, and at least one outlet is connected to each of said stages, for drawing off the solution from each stage after the solution has passed through at least a longitudinal portion of the respective stage.

In a preferred embodiment, an outer shell surrounds at least one outer membrane and at least one outlet is connected to the stage defined by the space between the at least one outer membrane and the shell. Further valves may be used in the outlet lines to vary the internal pressures in the stages, and in the outlet line from the outer shell (last stage).

In accordance with this invention, there is also provided a process for removing inorganic salts from an aqueous solution (1) containing the same, comprising a. forcing the solution (1), under pressure, through a first of a plurality of reverse osmosis stages, each including at least one semipermeable membrane, a charge inlet being connected to said first stage and an outlet being connected to each stage thereof, and obtaining in a second stage adjacent said first stage an aqueous solution (2) of lesser salt content than of said solution (1), and b. forcing said solution (2), under "back" pressure, from said second stage through at least one semipermeable membrane and obtaining in a subsequent stage adjacent said second stage an aqueous solution (3) of lesser salt content than solution (2), said "back" pressure being determined by the throttling effect provided by the settings of said "back" pressure controlling outlet valves, c. and maintaining the pressure in said first stage substantially above the osmotic pressure in said second stage to permit passage of said solution (1) through at least one membrane of said first reverse osmosis stage and passage of said solution (2) through the at least one membrane of the next reverse osmosis stage without pump-type repressurization.

DRAWINGS

FIG. 7 is a schematic, horizontal view of still another modified reverse osmosis separator unit;

FIGS. 8–11 are cross-sectional views of respective further embodiments of a reverse osmosis separator unit according to the present invention;

FIG. 12 is a sectional view of still another modified embodiment of the invention utilizing spiral wound units; and FIG. 13 is a cross-sectional view of still another modified reverse osmosis separator unit according to the present invention.

SPECIFIC EMBODIMENTS OF THE INVENTION

Figure 1:
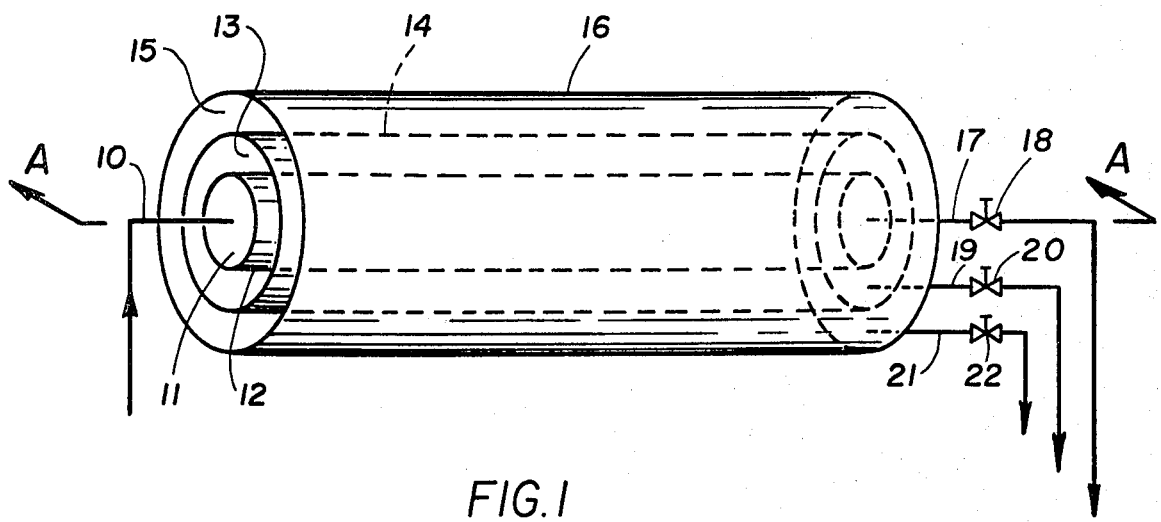
FIG. 1 is a schematic, horizontal view of a reverse osmosis separator unit having, for example, two semipermeable membranes, one inner zone and two annular zones.

Referring to FIG. 1, an embodiment of a reverse osmosis separation unit comprises an input feed line 10 for feeding a solution to be treated, such as seawater containing 36,000 parts per million (ppm) of dissolved salts to the unit. The feed line 10 feeds the input solution to a stage 11, which may be tubular, annular or spiral annular depending upon construction of the system. The outer boundary of stage 11 is defined by a tubular or spiral annular member 12 which is comprised of a first semipermeable membrane and a structural matrix or backing material. The structural matrix or backing material, which physically supports the unit, is not shown so as not to unduly obscure the inventive concept. Around tubular 12 is mounted a second tubular member 14, also made of a semipermeable membrane and a structural matrix or backing material. An annular stage 13 is defined between the first membrane 12 and the second membrane 14. Around membrane 14, and spaced therefrom, is an outer shell member 16. A second annular stage 15 is defined between membrane 14 and outer shell 16. As mentioned above, the membranes and outer shell 16 are maintained in relative position by means of structural elements, not shown. End plates, also not shown, are provided as should be apparent to those skilled in the art.

An output line 17, with a valve 18 therein, removes the unpermeated solution from the first stage 11, an output line 19 with a valve 20 therein removes solution from the middle annular stage 13 and an output line 21 with a valve 22 therein removes solution from the outer annular stage 15. In accordance with the present invention, the solution removed from the outer stage 15 is the purified output solution.

As discussed in more detail hereinbelow, the valves 18, 20 and 22 are adjustable and may be used to vary the internal pressures in the various stages 11, 13 and 15.

The inner stage 11 may be annular, spiral annular or generally tubular. If an internal, centrally axial, support structure for the apparatus is used, then this will result in an annular inner stage 11. Alternatively, the interior of the stage 11 may be kept "free," thereby resulting in a generally tubular including spiral annular interior stage 11.

The membranes 12, 14 and the outer shell member 16 need not be circular in cross-section. If desired, the cross-sectional configuration of the apparatus may be oval, rectangular, polygonal, spiral, helical, etc. Various shapes may be mixed in a given separator unit. The particular configuration will depend upon the particular system requirements. For ease of description the term "tubular" is deemed to encompass all of the above configurations of the membranes and the outer shell.

Additional membranes may be used to define additional annular stages to successively treat the permeates from the next inner stage. Membranes having different rejection capabilities may be used, depending upon system requirements, and a particular unit may be comprised of membranes having different respective rejection capabilities.

Figure 3:
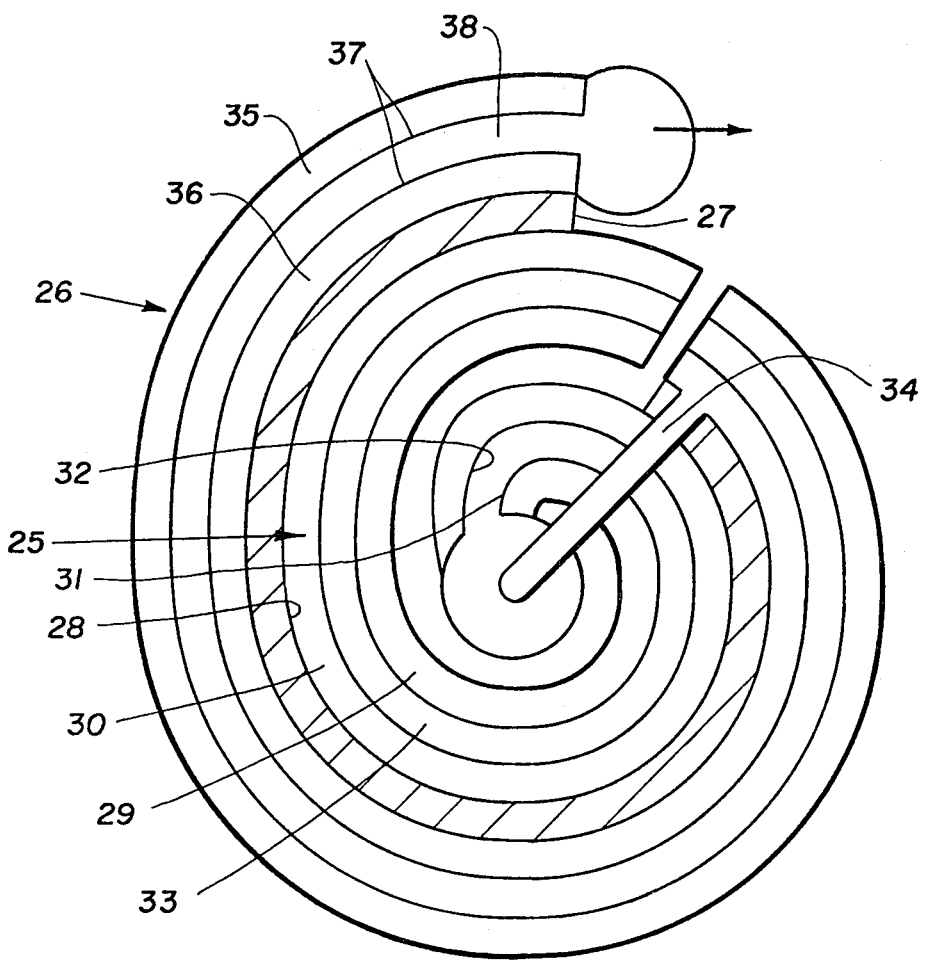
FIG. 3 shows a cross-sectional view of another embodiment of the present invention.
Figure 4:
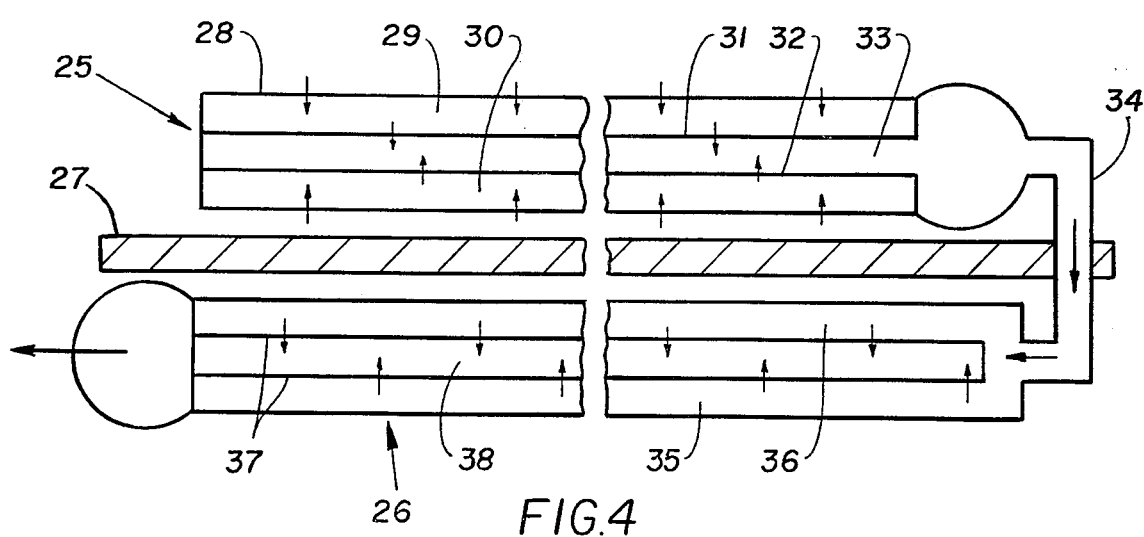
FIG. 4 shows the constituent elements of the embodiment of FIG. 3 in their unfolded state.

FIGS. 3 and 4 illustrate an embodiment of the present invention using spiral wound or "jelly roll" reverse osmosis semi-permeable membrane assemblies which are made, for example, by Universal Oil Products Company. In FIG. 4 the arrangement is shown in its "unfolded or unwound" state. The embodiment of FIGS. 3 and 4 is shown as containing two substantially annularly oriented units. It should be clear that the invention can be carried out using more than two units, as desired. The embodiment of FIGS. 3 and 4 generally includes two concentric "jelly-roll" membrane units 25 and 26 which are separated by a member 27. The input feed flow is through the outer layer 28 as indicated in FIG. 4. The input fluid flows in channels 29 and 30 and then permeates through membranes 31 and 32 into the central channel 33. The permeate from channel 33 then flows out and through connecting pipe 34 to the next stage 26. The permeate flowing in pipe 34 is fed through channels 35 and 36 of the second stage and permeates through the membrane 37 into the inner channel 38. The permeate from channel 38 is then fed out either to an output or to the next stage, as desired. FIG. 3 shows the structural elements of FIG. 4 in the rolled-up stage to form a "concentric jelly-roll" configuration. In FIG. 3, it is seen that the two stages are rolled up such that the two stages are substantially concentric with each other to form a substantially annular arrangement.

It should be clear that other types of spiral wound units, or the like, could be used in carrying out the present inventive concept.

Figure 5:
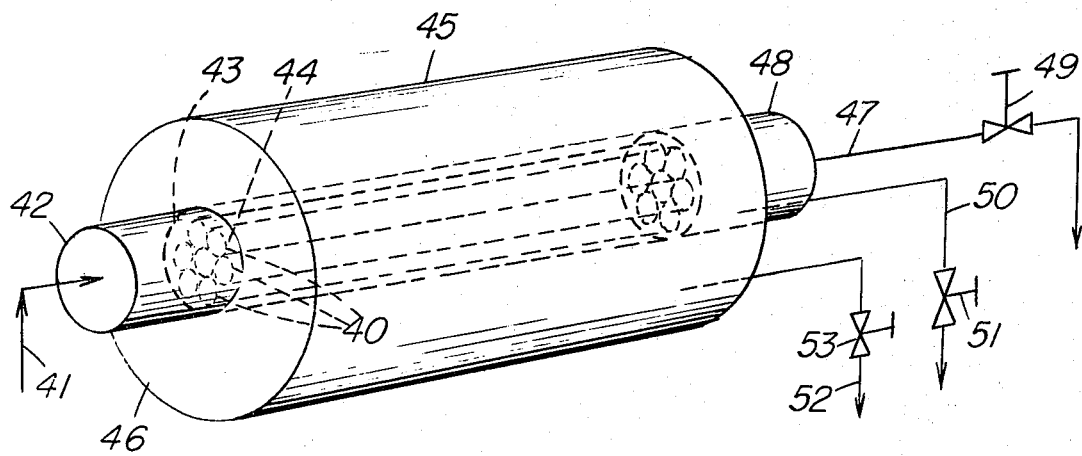
FIG. 5 is a schematic, horizontal view of a modified reverse osmosis separator unit.

FIG. 5 illustrates a modified embodiment of the present invention utilizing a plurality of first stage tubular, semi-permeable membranes 40 which are arranged in a "bundle." The input solution is fed to the tubular members 40 via a feed line 41 and a header unit 42 which couples the feed line to all of the tubular members 40. Around the bundle of tubular members 40 and spaced therefrom is a further semi-permeable membrane 43. An annular stage 44 is defined between the bundle of tube 40 and the membrane 43 which is positioned therearound. Around membrane 43, and spaced therefrom, is an outer shell 45. A second annular stage 46 is defined between the membrane 43 and the shell 45. As mentioned above with respect to FIG. 1, the various membranes and the outer shell 45 are maintained in relative position by means of conventional structural elements, not shown. End plates, also not shown, are provided as should be apparent to those skilled in the art. Also, as should be apparent, additional annulated stages may be provided as desired.

An output line 47 is coupled to the output end of the tubular members 40 via an output header 48 to remove the unpermeated solution from the tubular members 40. A valve 49 is connected in the output line 47. An output line 50 with a valve 51 therein removes solution from the annular stage 44 and an output line 52 with a valve 53 therein removes solution from the outer annular stage 46. In accordance with the present invention, the solution removed from the outer stage 46 via output line 52 is the purified output solution. The valves 49, 51 and 53 are adjustable so as to enable variation of the internal pressures in the various stages in order to insure proper operation in accordance with the invention.

The number of inner tubular membranes 40 used in the embodiment of FIG. 5 is not critical. The number of tubular members can be varied, depending upon system requirements. Moreover, FIG. 5 shows a single header 42 for supplying input solution in common to all of the tubular members 40, as well as a single output member 48 for drawing off the solution in common from all of the tubular members 40. If desired, individual header units and individual valves 49 may be provided for each or a selected plurality of tubular members at either or both the input or output of the tubular members 40.

Figure 6:
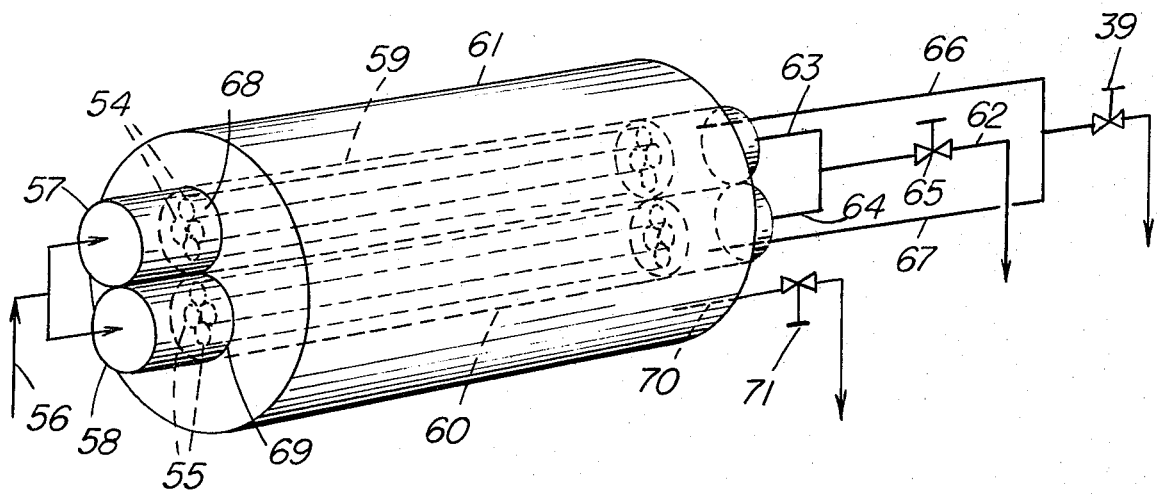
FIG. 6 is a schematic, horizontal view of a further modified reverse osmosis separator unit.

FIG. 6 illustrates a further embodiment of the present invention wherein the first stage is split into two units. In the FIG. 6 embodiment, the first stage comprises a bundle of tubular members 54 and a second bundle of tubular members 55. The feed line 56 for input solution couples the input solution to the bundle 54 by means of a common header 57 and to the bundle 55 by means of a common header 58. If desired, the headers 57 and 58 may be combined into a single unit, or individual headers may be provided for each of the individual tubes 54 and 55.

A tubular membrane 59 is spaced from and surrounds the tubular members 54 and a tubular membrane 60 is spaced from and surrounds the tubular members 55. Tubular members 59 and 60 define the second stage of the reverse osmosis unit. A shell 61 is provided which is spaced from and substantially annularly surrounds the second stage tubular members 59 and 60. The unpermeated solution is drawn off from the first stage via an output line 62 and headers 63 and 64, a valve 65 being connected in the output line 62. The first stage solution is drawn off by means of output lines 66 and 67 which are respectively coupled to the second stages 68 and 69, and are coupled in common to a valve 39. The output from the outer stage is drawn off via a line 70 having a valve 71 coupled therein. The valves 65, 39 and 71 serve the same purposes as the previously discussed valves. As mentioned with respect to FIG. 5, it is not necessary to provide a common header for the plurality of tubular members 54 and for the plurality of tubular members 55. The input solution may be individually fed to each of the individual tubular members 54 and 55. Additionally, the outputs from each of the tubular members 54 and 55 may be fed to individual output lines having individual control valves therein so as to vary the internal pressures in the various respective tubular membranes. The specific arrangements of input and output lines, headers and output valves may be varied depending upon particular system applications. The particular arrangements of headers and valves is not important, as long as the concept of the present invention regarding pressure control is adhered to.

FIGS. 7-10 show cross-sectional views of various other embodiments of the present invention. FIG. 7 is a three-stage system utilizing four bundles of first-stage membranes 72-75 and four membranes 76-79 respectively surrounding the four bundles 72-75. An outer third-stage membrane shell 80 surrounds the second-stage membranes in a substantially annulated manner providing a substantially annular space 81 between the third-stage membrane shell 80 and second-stage membranes 76-79. Appropriate feed lines, output lines, headers and output valves are provided, as should be apparent.

FIG. 8 shows another three-stage system utilizing a plurality of first-stage semi-permeable tubular members 82, each of which is surrounded by respective second-stage semi-permeable tubular members 83. These tubular members 82 and 83 may be, as illustrated, generally arranged in "bundles" and may be surrounded by an outer membrane shell member 84 as illustrated so as to provide a substantially annular space 85 between the bundles (tubular members 82 and 83) and the outer third-stage shell 84. The input solution may be fed individually or in common to the input tubular members 82 and the unpermeated output solution from tubular members 82 may be coupled out in common via a common header and common control valve or individually. Likewise, the unpermeated solution from the spaces 86 between respective tubular members 82 and 83 may be drawn off and controlled by means of valves either individually or in common via a common header. The unpermeated solution from third-stage 85 likewise may be drawn off by one or more outlet lines and associated control valves.

FIG. 9 illustrates a five-stage system having a plurality of first tubular semi-permeable membranes 87, a plurality of second tubular semi-permeable membranes 88 annularly arranged around respective membranes 87, a plurality of third tubular semi-permeable membranes 89 annularly arranged around respective membranes 88 and a plurality of fourth tubular semi-permeable membranes 90 arranged annularly around respective tubular membranes 89. A fifth tubular semi-permeable shell 91 is located spaced from and around the four membranes 90 so as to provide a substantially annular space 92 therebetween. Appropriate feed lines are fed to the first tubular membranes 87, either individually or in common, and appropriate output lines are coupled to the output end of tubular membranes 87 and to the interspaces between the various other tubular membranes. The outputs from the four individual annulated bundles may be coupled out in common or individually, with common control valves or with individual control valves, as desired. In FIG. 9, four-stage units are located adjacent each other and are preferably coupled in parallel, the fifth stage being defined between the outer shell 91 and the outer membrane 90.

FIG. 10 illustrates a four-stage system with four three-stage bundles arranged within an outer fourth stage shell 93. Only one bundle will be described with respect to FIG. 10, the other three being identical with the described bundle. The first stage tubular semi-permeable members 94 are respectively surrounded by tubular semi-permeable members 95. The four tubular members 95 are surrounded by a tubular semi-permeable member 96 so as to provide a substantially annular space 97 between the tubular members 95 and the tubular member 96. The four bundles enclosed by the four outer tubular members 96 are enclosed by the outer housing 93 so as to define a substantially annular space 98 therebetween. Appropriate feed lines, draw off lines and valves and headers are provided, along the lines discussed above with respect to the other embodiments.

FIG. 11 illustrates a three-stage system utilizing two spiral wound stages surrounded by an outer tubular semi-permeable this stage membrane 99. An outer rising 100 surrounds the outer membrane 99 so as to define a space 101 therebetween for collection of refined solution. Alternatively, this outer housing could be made to be a semi-permeable membrane, and space 101 could be "back-pressurized" to comprise a fourth stage, with product water collected by a trough as in FIG. 12 (below). The two spiral wound units are identical to those shown in FIGS. 3 and 4 and a further discussion thereof is deemed unnecessary. Appropriate feed lines, output lines, headers and valves are provided.

FIG. 12 illustrates a two-stage system utilizing a collector trough for permeate or end-product solution. In FIG. 12, four bundles of first stage tubular semi-permeable members 102-105 are provided, each bundle being surrounded by a respective tubular semi-permeable member 106-109. The output solution from the second stage members 106-109 falls into the collecting trough for collection of the end product solution. Appropriate feed lines are connected to the first stage tubular members 102-105 and appropriate output lines with associated valves and headers are connected to the output ends of the tubular members 102-105, and to the spaces 110-113 between the respective first and second stage membranes. As discussed above, the solution may be supplied in common to the first stage tubes or individually, and the solution may be drawn off either in common or individually from the four "bundles" comprising the two stage system of FIG. 12.

FIG. 13 shows a modified form similar to FIG. 5 wherein each of the first stage tubular members 40 have individual output lines and associated valves. In FIG. 13, parts in common with the FIG. 5 embodiment are illustrated with the same reference numerals. The inner tubular members 40 have respective output lines 115 individually coupled thereto. Each line 115 has a control valve 116 coupled therewith for control of the internal pressure in the various stages.

In addition to the embodiments shown in FIGS. 5–13, it should be clear that the present inventive concept contemplates the use of various arrays of tubular semi-permeable membranes in substantially any combination of parallel and/or annulated geometry to comprise dual and multi-stage reverse osmosis separator units having improved operational characteristics as described hereinabove. In accordance with the invention appropriate valving is provided so as to provide the desired back-pressure so as to substantially eliminate the need for repressurization in the system. Depending upon the diameter of the multi-tube stages, the individual tubes may have individual back-pressures valves coupled thereto. Additionally, it may be practical and desirable to provide valves in both the inlet and outlet ends of each tube of a multi-tube section or stage to enable a leaking tube to be valved off and operations continued with the remainder of the system without interruption for shut-down or maintenance.

By virtue of the multi-tube stages, it is possible to provide larger membrane area for a unit of given size.

As used herein, the term "annulated" and the term "annular" denote structures defining substantially round spaces therebetween. For example, the space 44 in FIG. 5 is not strictly round, but for the purposes of the present invention, the bundle of tubular members 40 and the tubular members 43 are "annular" with respect to each other. Similarly, in FIG. 6 the space between the outer shell 61 and the inner membranes 59 and 60 is "annular" within the meaning of this invention.

Figure 2:
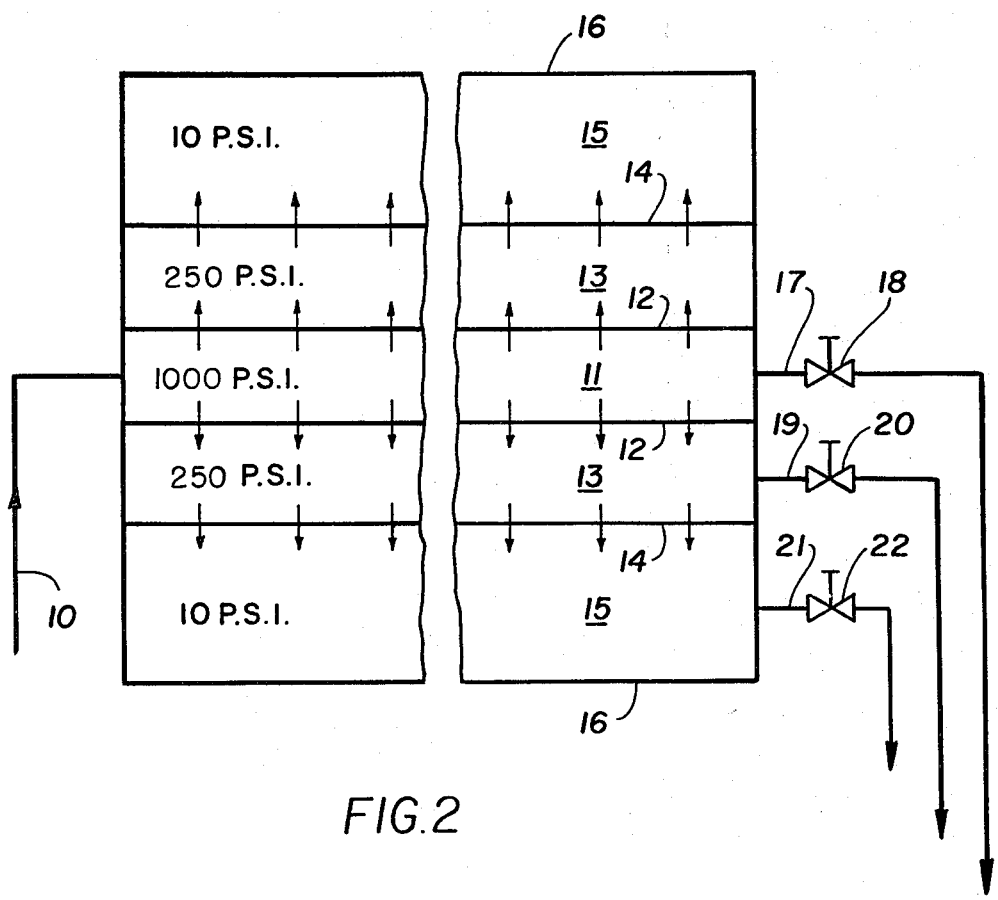
FIG. 2 shows a cross-sectional view of the unit of FIG. 1 taken along the line A—A.

A preferred technique for removing salts from seawater is illustrated by reference to FIGS. 1 and 2. Seawater, containing 36,000 parts per million (ppm) of dissolved salts is charged through line 10 at a pressure of about 1,000 more or less depending upon the desired amount of driving force in excess of the osmotic pressure of seawater (approximately 870 psi). The charged seawater is to a first inner stage 11 comprised of first semi-permeable membrane 12 and a structural matrix or backing material. The capacity of membrane 12 for rejection of dissolved sodium chloride, the predominant component of the seawater, can be, for example, about 90 percent. Unpermeated solution is removed from stage 11 through line 17 containing valve 18. The output from line 17, when concentrated by a factor of two, would contain approximately 72,000 ppm of dissolved salts.

The pressure of the solution charged into the first stage may range from as low as 20 psi for brackish water feeds to as high as 4,500 psi for highly saline water feeds.

The permeate from stage 11 is obtained in a second annular stage 13 and will contain about 5,400 ppm of dissolved salts. Stage 13 is bounded by second semi-permeable membrane 14 and a structural matrix of backing material. Membrane 14 can be the same as membrane 12 or can be more or less permeable than membrane 12; preferably, for seawater desalination, it is in the order of 90%. In this illustration, membranes 12 and 14 are the same. Thus, the permeate from the first stage 11 (or the first or extreme inner tube) becomes the feed for the annular stage 13 (or the annulus space between the "extreme inner" and "next outer" tube). The reverse osmotic pressure requirement of the permeate in stage 13 is provided by maintaining a sufficient backpressure on line 17 by controlling valve 18. In this illustration, the pressure maintained in stage 13 is approximately 250 psi.

Unpermeated solution in stage 13 is removed therefrom through outlet 19 containing valve 20. As indicated above, this will contain about 11,000 ppm of dissolved salts when concentrated by a factor of two.

The permeate from stage 13 is obtained in a further annular stage 15 and contains about 800 ppm of dissolved salts. This permeate is removed from the system in stage 15 through line 21 containing valve 22. Pressure in this annular product water stage 15 may be negligible or positive to force the product water to a storage tank (not shown), for example, a collection zone.

It will be understood that one or more additional annular stage(s) can be employed in order that a permeate of lesser dissolved salts content can be obtained. In so modifying the unit described above for treating seawater, the initial pressure of the seawater feed can be greater or less than the 1,000 psi illustrated here, such that the several interannular pressures will be sufficient to overcome the osmotic pressure in each successive annulus and permit further partial separation of dissolved salts from the successive solutes. As required, the interannular pressures can be controlled with valves 18, 20, 22, etc. such that there will be sufficient pressure in the penultimate annular stage to overcome the osmotic pressure in the final annular stage preceding the product water collection zone or annulus, if employed. The pressures discussed above with reference to FIG. 2 may be varied, depending, among other things on the solution and membranes used. The values discussed are given only by way of illustrative example which is not limiting of the inventive concept.

As illustrated above, initial pressurization of the seawater, or other aqueous solution to be purified, and subsequent control of the permeated and unpermeated (spent) solution fractions on each side of a reverse osmosis semi-permeable membrane for pressure control, eliminates interstage repressurization. It is to be noted that staged desalination accomplished by back-pressurization in the manner described minimizes the pressure drop across the membrane and provides some support to maintain the structural integrity thereof. Thus, it is possible to use thinner membranes to accomplish the described separations than without such pressure operations.

Reverse osmosis semi-permeable membranes suitable for desalination of aqueous solutions are well known in the art, and are useful for the purposes of this invention. Typical membranes include: tubular units, spiral-wound units, and hollow, fine fiber units manufactured of materials such as cellulose acetate or nylon.

Nylon is a superpolymeric amide prepared from aliphatic dicarboxylic acids, such as adipic and sebacic acids and aliphatic diamines such as hexamethylene diamine.

Temperatures employed are not critical. Suitable temperatures are 60°–120°F.

Initial pressure of a solution charge, and thus the power requirements, will correspond to that required to exceed the osmotic pressure of the dissolved salt solution by an amount related to the membrane rejection characteristics of the membrane and the driving force needed for permeation of the membrane at the designated rejection rate and desired permeate flow for each stage. This initial pressure can vary, for seawater feed concentration from about 1000 psi, more or less, for a membrane having a salt-rejection characteristic of about 90% to as high as 4,500 psi for a membrane having a very high salt rejection rate (e.g., 99%).

The invention has been illustrated by purification of seawater. It is to be understood that other aqueous solutions containing dissolved inorganic salts can also be so treated, including brackish waters.

I claim:

1. Process for removing inorganic salts from an aqueous solution (1) containing the same, comprising
   a. forcing the solution (1), under pressure, through a first of a plurality of reverse osmosis stages, each stage including at least one tubular-shaped semi-permeable membrane, and at least one stage including a generally annularly arranged membrane, a charge inlet being connected to said first stage and an outlet being connected to each stage thereof, each outlet including a "back" pressure controlling outlet valve and obtaining in a second stage adjacent said first stage an aqueous solution (2) of lesser salt content than of said solution (1) and
   b. forcing said solution (2) under "back" pressure from said second stage through at least one semi-permeable membrane and obtaining in a subsequent annular stage adjacent said second stage an aqueous solution (3) of less salt content than solution (2), said "back" pressure being determined by the throttling effect provided by the settings of said "back" pressure controlling outlet valves,
   c. and maintaining the "back" pressure in said first and subsequent stages substantially above the respective osmotic pressures in their respective following stages to permit passage of said solution (1) through said at least one membrane of said first reverse osmosis stage, passage of said solution (2) through said second reverse osmosis stage, and passage of respective solutions through subsequent reverse osmosis stages without interstage repressurization with a pump.

2. Process of claim 1, wherein said solution (1) is a seawater.

3. Process of claim 1, wherein said solution (1) is a brackish water.

4. Process of claim 1, wherein the pressure of said solution (1) is about 1,400 psi.

5. Process of claim 1, wherein the pressure of said solution (1) ranges from about 20 psi to about 4500 psi.

6. Process of claim 1, wherein solution (1) is under a pressure sufficiently high and wherein said "back" pressures are maintained sufficiently high that the pressure in the penultimate stage is sufficient to overcome the osmotic pressure in said final stage.

7. Process of claim 1, wherein at least one of said stages comprises a plurality of semi-permeable membranes.

8. Process of claim 1, wherein at least one stage is generally annular.

9. A reverse osmosis separator unit comprising:
   a plurality of reverse osmosis separator stages, each stage including at least one semi-permeable membrane, and at least one stage including a generally annularly arranged membrane, at least one annulated outer membrane defining a final stage;
   charge inlet means connected to at least one of said stages for feeding a pressurized charge solution to said separator unit; and
   outlet means connected to each of said stages for drawing off a solution from each stage after the solution has passed through at least a longitudinal portion of the respective stages, each outlet means including a "back" pressure controlling outlet valve for maintaining the pressure in its respective stage substantially at a predetermined value which is sufficient to enable passage of the solution through said plurality of membranes without interstage repressurization with a pump.

10. A reverse osmosis separator unit according to claim 9 comprising an outer shell surrounding at least one outer membrane, said final stage being defined by the space between said at least one outer membrane and said outer shell.

11. A reverse osmosis separator unit according to claim 9 wherein said valves are adjustable to vary the internal pressures in the respective stages.

12. A reverse osmosis separator unit according to claim 9 wherein said semi-permeable membranes are of generally round cross-section.

13. A reverse osmosis separator unit according to claim 9 wherein said semi-permeable membranes are tubular.

14. A reverse osmosis separator unit according to claim 9 wherein each of said membranes has substantially the same rejection characteristic.

15. A reverse osmosis separator unit according to claim 9 comprising membranes having different rejection characteristics.

16. A reverse osmosis separator unit according to claim 9 wherein said first stage comprises at least one tubular-shaped zone.

17. A reverse osmosis separator unit according to claim 9 wherein said charge inlet is connected to said first stage, which is the inner-most stage.

18. A reverse osmosis separator unit according to claim 17 wherein said first stage includes a plurality of tubular-shaped membranes, and said charge inlet is coupled in parallel to said first stage membranes to feed charge solution into said first stage membranes.

19. A reverse osmosis separator unit according to claim 18 wherein said first stage membranes are arranged in a bundle and including a second stage membrane annularly mounted around said bundle.

20. A reverse osmosis separator unit according to claim 19 wherein said first stage membranes are arranged in a plurality of bundles, each bundle having a respective second stage membrane mounted therearound.

21. A reverse osmosis separator unit according to claim 18 wherein each of said first stage membranes has a respective second stage membrane annularly mounted therearound.

22. A reverse osmosis separator unit according to claim 9 wherein at least one stage includes a plurality of membranes coupled in parallel fluid flow with each other.

23. A reverse osmosis separator unit according to claim 22 wherein at least two stages include a plurality of membranes, the membranes of respective stages being coupled in parallel fluid flow, the membranes of one of said two stages annularly surrounding at least one membrane of the other of said two stages.

24. A reverse osmosis separator unit according to claim 22 comprising a single "back" pressure controlling valve coupled in common to the outlet means of each of said plurality of membranes of said at least one stage.

25. A reverse osmosis separator unit according to claim 22 comprising a plurality of "back" pressure controlling valves coupled to the outlet means of said plurality of membranes of said at least one stage.

26. A reverse osmosis separator unit according to claim 9 wherein at least one of said stages is defined by a spiral wound membrane unit.

27. A reverse osmosis separator unit according to claim 26 including a tubular-shaped membrane annularly mounted around said at least one spiral wound membrane unit.

28. A reverse osmosis separator unit according to claim 26 wherein each of said spiral wound units comprises a central fluid passage surrounded by a semi-permeable membrane; and means forming outer fluid passages surrounding said semi-permeable membrane through which charge is fed to said stage.

29. A reverse osmosis separator unit according to claim 26 comprising pipe means interconnecting successive spiral would stages.

* * * * *